May 17, 1938.  F. G. BLOCH  2,117,287
MEASURING DEVICE
Filed June 2, 1936  2 Sheets-Sheet 2
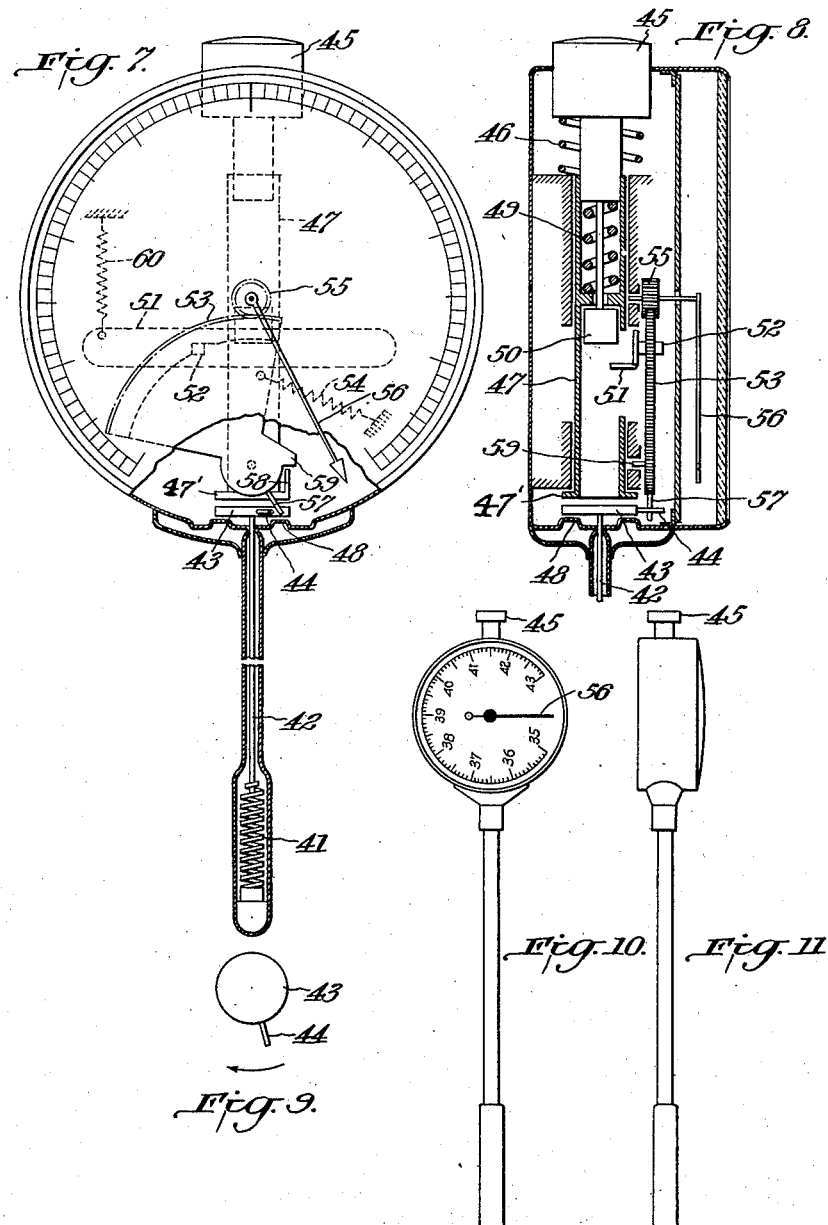
Inventor:
Franz Georg Bloch
By Potter, Pierce & Scheffler
Attorneys.

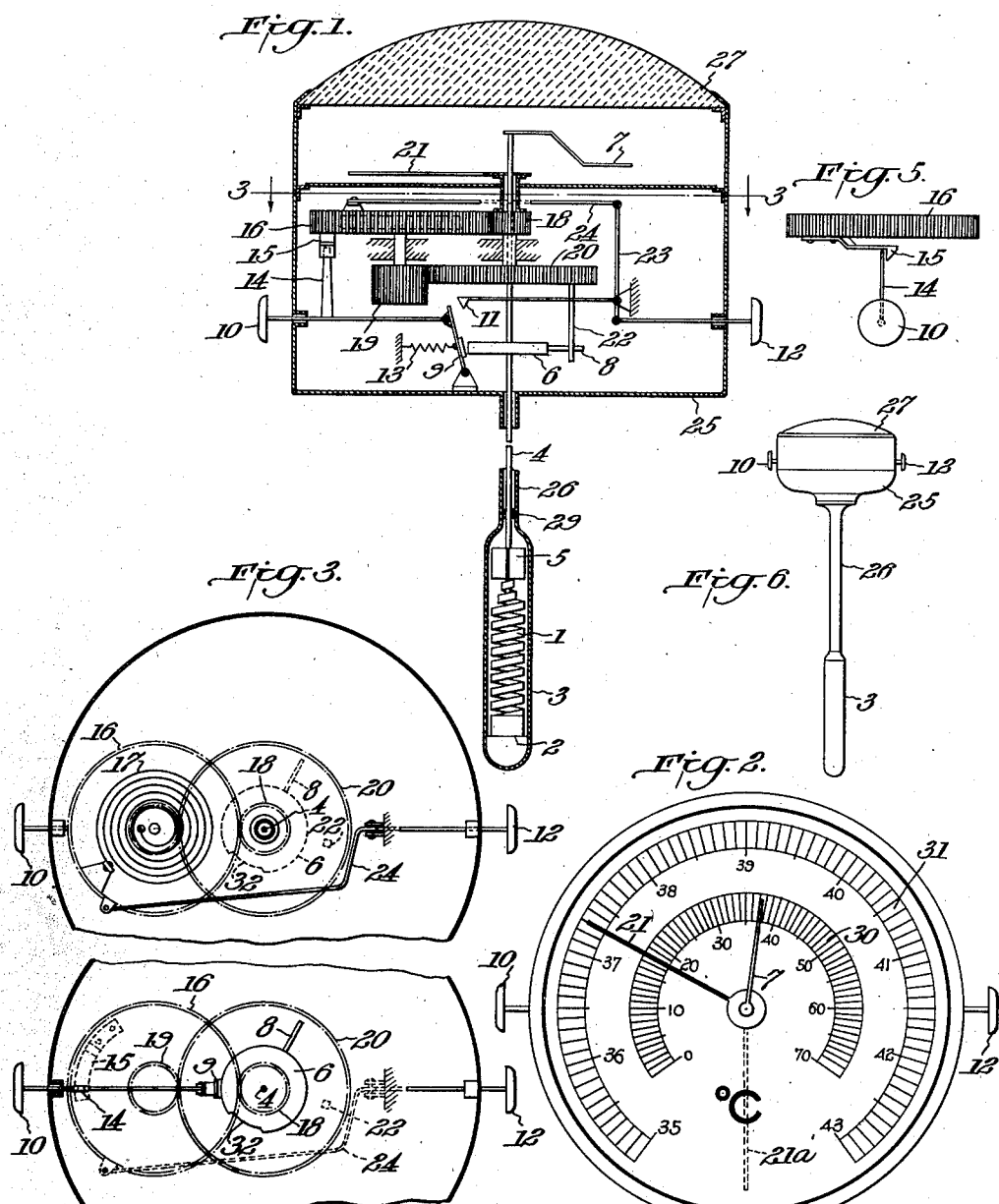

Patented May 17, 1938

2,117,287

UNITED STATES PATENT OFFICE 2,117,287

MEASURING DEVICE

Franz Georg Bloch, Leitmeritz, Czechoslovakia, assignor to Rota S. A., La Chaux-de-Fonds, Switzerland Application June 2, 1936, Serial No. 83,145
In Czechoslovakia October 29, 1935

14 Claims. (Cl. 73—367)

This invention relates to means for amplifying the change of position of a measuring element of low torque and provides mechanism whereby the movement of a measuring element may be indicated on any desired scale independently of the torque of the measuring element.

A principal object of the invention is to provide means whereby the movement of a measuring element of relatively low torque may be utilized for indication or control on any desired scale and to any desired extent without limitation by the torque of the measuring element.

This object and other useful objects are accomplished by utilizing the movement of the measuring element to determine the extent of movement of an independently energized indicating or controlling element.

The invention will be more particularly described for the purpose of illustration in its embodiment in a bimetallic thermometer capable of use as a clinical thermometer. Bimetallic thermometers with a temperature-sensitive element consisting of a spiral or helical spring of known construction, and in which the movement of the temperature-sensitive element is transmitted to a pointer and a dial, have been in use heretofore as household and industrial thermometers. By means of the invention the bimetallic thermometer has been given the smallest possible construction, the high degree of accuracy, and the high degree of responsiveness which is necessary and essential for a thermometer for clinical purposes. The main difficulty to be solved is the fact that the temperature-sensitive element has to be housed in a container of very small proportions and that these proportions are subject to definite limits as the shaft of this thermometer must be adapted to the particular requirements of a thermometer for clinical purposes. Consequently the torque of the temperature-sensitive element must necessarily be small owing to the reduced size of this element, and this minimum amount of torque does not allow any additional load. On the other hand, in the case of a thermometer for clinical purposes, a high degree of accuracy and a high degree of clearness of the indication are essential, which calls for a certain amount of torque.

According to the invention the problem is solved by the feature that the indication of the blood temperature is not affected directly by the temperature-sensitive element. An independent mechanical device for the supply of additional torque and a device for holding the temperature pointer in its maximum position have been arranged between the pointer which indicates the blood-temperature and the temperature-sensitive element. These devices are only put into operation when a temperature reading is taken.

The invention will be described with particular reference to the accompanying drawings, in which:

Fig. 1 is a view in partial section of a clinical thermometer embodying the principles of the invention;

Fig. 2 is a plan view of the dial of the thermometer;

Fig. 3 is a fragmentary section on line 3—3 of Fig. 1;

Fig. 4 is a detail of the mechanism of Fig. 1;

Fig. 5 is a further detail of the mechanism of Fig. 1;

Fig. 6 is an elevation of the thermometer of Fig. 1;

Fig. 7 is an elevation in partial section of a clinical thermometer embodying a modified form of the invention;

Fig. 8 is a fragmentary transverse section substantially on the center line of Fig. 7;

Fig. 9 is a detail of the mechanism of Fig. 7;

Fig. 10 is a front elevation and Fig. 11 is a side elevation of the thermometer of Fig. 7.

In Figs. 1–6, 1 is the bimetallic spring, which in this case is shown as a stepped torsion spring, and which is mounted in the spring holder 2. Spring holder 2 is mounted in a metal cap 3 which is made of metal of high heat conductivity. The spring is connected with staff 4 and on the staff are mounted damping wings 5, stop-disk 6 and pointer 7 for the ordinary temperature dial. The stop 8 projects radially from the disk 6 and has a fixed relationship to the pointer 7. The staff 4 is turned in the usual manner by the bimetallic spring 1, and the pointer 7 and stop 8 are thereby adjusted to positions corresponding to the temperature of the spring 1.

A precision reading is obtained by first clamping the staff 4 against rotation and determining the angular displacement of the stop 8 by a separate indicator system. The staff may be clamped by a lever 9 when the push-button 10 is pressed in to latch the lever in holding position by its engagement with the pawl 11. The pawl 11 is released by a second push-button 12 and the spring 13 returns the lever 9 to its inoperative position. The inward movement of the push-button 10 displaces the slide 14 to free the stop 15 of a gear wheel 16, thus permitting rotation of the gear wheel by the spring 17. The gear 16 meshes with a pinion 18, and is connected to the pinion 19 that meshes with a gear 20. The pinion 18 carries the precision pointer 21 and the gear 20 has a stop 22 that extends into the path of movement of the stop 8 on the disk 6. The spring 17 drives the transmission gearing until the stop 22 touches the stop 8, and the position of the precision pointer 21 is thus dependent solely upon the position of the stop 8, i. e. the angular displacement of the staff 4. Lost motion in the transmission gearing does not affect the accuracy of the indication, as the gearing always works in the same direction when a reading is to be made. A lever 23 is actuated by the push-button 12 and connected to the gear wheel 16 by a link 24 to rotate the same in opposition to the spring 17 to reset the precision measuring apparatus. When the push-button 12 is pressed in, the pawl 11 releases the clamping lever 9 and the slide 14 is returned to its normal position for engagement by the stop 15 to hold the spring 17 under tension. The reverse rotation imparted to the gear 16 by the link 24 rotates the pinion 18 to return the pointer 21 to the neutral position 21a, as shown in dotted lines in Fig. 2.

This type of thermometer substantially removes any possibility of a falsification of the temperature indication by a patient as is possible in the case of the mercury clinical thermometer in which the mercury column remains in its position of maximum temperature indication. When using the new thermometer, the push-button 10 is operated by the physician or nurse immediately prior to the taking of a reading, and in case of doubt, the operation can be repeated at once as a reading may be taken in a few seconds. The push-buttons may be located in countersunk openings in the casing in such manner that the precision reading can be obtained only by the use of a key which is kept by the doctor or nurse.

The complete mechanism is housed in the casing 25, which is connected to the protection cap 3 by means of the metal tube 26. Preferably this casing 26 is a thin tube of metal of relatively low heat conductivity, for instance, a nickel-iron composition. The walls of the tube should be as thin as is permissible with a view to the necessary strength. It is also possible to make the tube 26 of an insulating material of the required strength. The casing is covered by a powerful magnifying glass 27 which magnifies the graduations and the pointers. In order to increase the responsiveness, the cap 3 can be filled with a liquid medium, for instance with a non-corrosive oil. As the supporting bearing 29 allows only very little play to the staff, the oil is retained within the cap by the adhesion of the fluid.

As shown in Fig. 2, the primary pointer 7 moves over an inner temperature scale 30, and precision pointer 21 moves over a longer outer scale 31. The inner scale 30 is illustrated as graduated from zero to 70° C., while the precision scale is graduated from 35° to 43° C. An angular displacement of one degree on the precision dial corresponds to an angular displacement of ten degrees on the ordinary dial. It is possible, of course, to obtain any desired relationship between the sets of scale graduations by an appropriate selection of the gear ratios of the transmission mechanism.

Since the outer scale corresponds to only a fraction of the inner temperature scale, means is provided to prevent an actuation of the precision indicator when the temperature lies outside of the range of the precision scale. As shown in Figs. 3 and 4, the stop disk 6 has a circumferential cut 32 extending along that portion of the disk which is alined with the clamping lever 9 when the disk 6 is rotated into positions corresponding to the temperature range of from 35° to 43° C. This section 32 of reduced radius permits a full movement of the clamping lever 9 into latching engagement with the pawl 11, also such movement of the slide 14 as will clear the stop 15. The remaining portions of the stop disk 6 which aline with the lever 9 at temperatures outside of the range of precision readings are of such larger diameter that the slide 14 can not be displaced to free the stop 15 and the lever 9 can not be latched by the pawl 11.

This limitation of the use of the precision pointer to a definite range is not necessary in the case of thermometers for general use. When the entire disk 6 is of such radius as to permit use of the precision indicator, the graduations of the outer precision scale must be spread out over the full three hundred and sixty degrees and the markings of the scale will not be in degrees but in fractional units which depend upon the selected ratio of the transmission gearing. When the outer precision scale is divided into ten units, the transmission ratio will preferably be such that the temperature degrees are shown on the inner dial 30 and tenths of degrees are indicated by the position of the precision pointer on the outer scale. Smaller units than tenths of degrees can be indicated by graduations between the main subdivisions of the scale into ten units.

Because of its strength, the thermometer can also be used for measuring the temperature at any part of the body, when it is pressed against the part of the body, the temperature of which one wants to measure, for instance the leg of a patient, by means of a bandage. In order to increase the supply of heat, the cap, in which the bimetallic spring is housed, may, for practical reasons, be surrounded by a cover made of thin material with a high heat conductivity, for instance, sheet-silver, and having flat ends of the same material, which can adapt themselves to the shape of the part of the body.

The bimetallic thermometer for clinical purposes can also be constructed in such a way that the surface of the dial will be parallel with the staff of the bimetallic spring, as is shown in Figs. 7–11. This thermometer consists of the bimetallic spring 41 which carries the staff 42 on which is mounted the friction disk 43 with its radial stop 44. The push-button 45 is slidable axially of the staff 42 and is normally retained in outer or inoperative position by a spring 46. The push-button may be pressed in to move the sliding sleeve 47 to press the friction disk 43 against the bearing surface 48 by compressing the spring 49 which is somewhat stronger than the spring 46. A separation of the push-button 45 and the sleeve 47 is prevented by the enlarged extension 50 of the push-button which also acts to release the precision measuring elements. When the sliding movement of the sleeve 47 is arrested by the clamping engagement of its terminal flange 47' with the friction disk 43, the spring 49 is compressed and the stop 50 moves downward to engage the lever 51 and depress the same. A stop 52 on the lever 51 is normally engaged in a recess in the arcuate gear member 53 to prevent turning movement of the latter by the spring 54. The arcuate member 53 has teeth meshing with the pinion 55 which is fixed to the staff of the precision pointer 56. The arcuate member or segment 53 has a stop extension 57 that moves in a path which is intercepted by the stop 44 of the friction disk, and the angular movement of the segment and the precision pointer depends therefore upon the angular displacement of the stop 44. When the push-button 45 is released, the segment is restored to its original position by the flanged extension 58 of the sleeve 47 which engages the projection 59 of the segment. The lever 51 is normally held in raised position by a spring 60, and the latch 52 of the lever 51 therefore snaps into the recess of the segment 53 to retain the latter as soon as it is restored to normal position. This latching of the segment 53 against movement during the subsequent initial depression of the push-button 45 is essential since the segment 53 must not turn until the flange 47' of the sleeve 47 has clamped the friction disk 43 against movement. If desired, a latch or lock may be used to retain the push-button 45 in depressed position when a reading is to be taken.

The invention is in no way limited to the described constructional details, and its principles allow various other constructions, when, for instance friction disks or magnets are used instead of the cam-disk, when one push-button is used instead of two, when the dials are made to rotate and the pointers are stationary, when air is used to damp the movement of the spring instead of oil, or when an eddy current brake is used, and the like.

The devices for the supply of additional torque, for the transmission and for the withholding of the indication, which have here been proposed, for instance for the clinical thermometer, can, according to their principles, also be used in connection with all types of instruments, where because of the small amount of torque or other force, the same or similar conditions apply.

I claim:

1. Mechanism for indicating the movement of a measuring element of low torque comprising means for arresting the measuring element in any of its positions, an indicating element, means for imparting movement to said indicating element, and means including a stop carried by said measuring element for limiting the amount of movement of the indicating element in accordance with the position at which the measuring element is arrested.

2. Mechanism for indicating the movement of a measuring element of low torque comprising means for arresting the measuring element in any of its positions, an indicating element, means for imparting movement to said indicating element, and stop members connected with said measuring element and said indicating element, respectively, coacting to limit the amount of movement of the indicating element in accordance with the position at which the measuring element is arrested.

3. Mechanism for indicating the movement of a measuring element of low torque comprising means for arresting the measuring element in any of its positions, an indicating element, normally inoperative means for imparting movement to said indicating element, stop means connected with said measuring element and said movement imparting means to limit the amount of movement of the indicating element in accordance with the position at which the measuring element is arrested and means for bringing into operation both the measuring element arresting means and the indicating element moving means.

4. A thermometer comprising a temperature-responsive element of low torque, an indicating element, means energized independently of the temperature-responsive element for imparting motion to said indicating element, means for arresting the temperature-responsive element in any of its positions to be indicated, and means for limiting the amount of movement imparted to said indicating element in accordance with the position at which the temperature-responsive element is arrested.

5. A thermometer comprising a temperature-responsive element of low torque, an indicating element, normally inoperative means energized independently of the temperature-responsive element for imparting motion to said indicating element, means for arresting the temperature-responsive element in any of its positions to be indicated, means for limiting the amount of movement imparted to said indicating element in accordance with the position at which the temperature-responsive element is arrested, and means for rendering operative said motion-imparting means.

6. A thermometer comprising a temperature-responsive element of low torque, an indicating element, normally inoperative means energized independently of the temperature-responsive element for imparting motion to said indicating element, means for arresting the temperature-responsive element in any of its positions to be indicated, means for limiting the amount of movement imparted to said indicating element in accordance with the position of the temperature-responsive element, and means for simultaneously bringing into operation the arresting means and the motion-imparting means.

7. A thermometer comprising a temperature-responsive element of low torque, an indicating element, normally inoperative means energized independently of the temperature-responsive element for imparting motion to said indicating element, means for arresting the temperature-responsive element in any of its positions to be indicated, means for limiting the amount of movement imparted to said indicating element in accordance with the position of the temperature-responsive element, means for simultaneously bringing into operation the arresting means and the motion-imparting means, and means for re-energizing said motion-imparting means upon release of said arresting means.

8. A thermometer comprising a temperature-responsive element of low torque, an indicating element operated by said temperature-responsive element, a second indicating element of a higher order of precision than said first-named indicating element, means operative independently of said temperature-responsive element for imparting movement to said second-named indicating element, and means for limiting the amount of movement of the second-named indicating element in accordance with the position of said temperature-responsive element.

9. A high-precision bimetallic thermometer comprising a bimetallic temperature-responsive element, an indicating element, means for arresting the movement of the temperature-responsive element in a position to be indicated, means operative independently of said temperature-responsive element for imparting movement to said indicating element, and means for limiting the amount of movement of the indicating element in accordance with the position at which the temperature-responsive element is arrested.

10. A high-precision bimetallic thermometer comprising a bimetallic temperature-responsive element, an indicating element, means for arresting the movement of the temperature-responsive element in a position to be indicated, means for imparting movement to said indicating element, means for limiting the amount of movement of the indicating element in accordance with the position at which the temperature-responsive element is arrested, said motion-imparting means including means for amplifying the movement of the indicating element to a higher order than the movement of the temperature-responsive element.

11. A high-precision bimetallic thermometer comprising a bimetallic temperature-responsive element, an indicating element, means for arresting the movement of the temperature-responsive element in a position to be indicated, means for imparting movement to said indicating element, and means for limiting the amount of movement of the indicating element in accordance with the position at which the temperature-responsive element is arrested, said motion-imparting means including gearing adapted to amplify the movement of the indicating element.

12. A high-precision bimetallic thermometer comprising a bimetallic temperature-responsive element comprising a helical spring, an indicating element, means for arresting the movement of the temperature-responsive element in a position to be indicated, means operative independently of said temperature-responsive element for imparting movement to said indicating element, and means for limiting the amount of movement at which the indicating element in accordance with the position of the temperature-responsive element is arrested.

13. A high-precision bimetallic thermometer comprising a bimetallic temperature-responsive element, means for damping oscillations of the temperature-responsive element, an indicating element, means for arresting the movement of the temperature-responsive element in a position to be indicated, means for imparting movement to said indicating element, and means for limiting the amount of movement of the indicating element in accordance with the position at which the temperature-responsive element is arrested.

14. A high-precision thermometer as claimed in claim 13, wherein said damping means comprises a casing enclosing said temperature-responsive element, and a fluid medium in said casing for damping oscillations of said element.

FRANZ GEORG BLOCH.